US008874754B2

(12) United States Patent
Salinca et al.

(10) Patent No.: US 8,874,754 B2
(45) Date of Patent: Oct. 28, 2014

(54) LOAD BALANCING IN HANDWRITTEN SIGNATURE AUTHENTICATION SYSTEMS

(71) Applicant: Softwin SRL Romania, Bucharest (RO)

(72) Inventors: Andreea Salinca, Bucharest (RO); Ana M. Pricochi, Bucharest (RO); Bogdan N. Ivascu, Bucharest (RO); Mircea S. Rusu, Bucharest (RO)

(73) Assignee: Softwin SRL Romania, Bucharest (RO)

( * ) Notice: Subject to any disclaimer, the term of this patent is extended or adjusted under 35 U.S.C. 154(b) by 270 days.

(21) Appl. No.: 13/653,304

(22) Filed: Oct. 16, 2012

(65) Prior Publication Data

US 2014/0108656 A1  Apr. 17, 2014

(51) Int. Cl.
G06F 15/173 (2006.01)

(52) U.S. Cl.
USPC ............... 709/226; 709/204; 726/4; 713/151

(58) Field of Classification Search
USPC .................. 709/204, 226; 713/151; 726/4
See application file for complete search history.

(56) References Cited

U.S. PATENT DOCUMENTS

| 5,487,170 | A  | 1/1996  | Bass et al. |
| 5,930,804 | A  | 7/1999  | Yu et al. |
| 5,987,232 | A  | 11/1999 | Tabuki et al. |
| 6,018,739 | A  | 1/2000  | McCoy et al. |
| 6,928,547 | B2 | 8/2005  | Brown et al. |
| 7,298,873 | B2 | 11/2007 | Miller, Jr. et al. |
| 7,606,396 | B2 | 10/2009 | Miller et al. |
| 7,613,929 | B2 | 11/2009 | Cohen et al. |
| 7,962,914 | B2 | 6/2011  | Caccavale |
| 7,962,916 | B2 | 6/2011  | Ramanathan |
| 2002/0032777 | A1 | 3/2002  | Kawata et al. |
| 2002/0198995 | A1 | 12/2002 | Liu et al. |
| 2005/0278520 | A1 | 12/2005 | Hirai et al. |
| 2006/0155862 | A1 | 7/2006  | Kathi et al. |
| 2006/0168571 | A1 | 7/2006  | Ghiasi et al. |
| 2008/0031496 | A1 | 2/2008  | Takagi et al. |
| 2008/0178008 | A1 | 7/2008  | Takahashi et al. |
| 2009/0100269 | A1 | 4/2009  | Naccache |

(Continued)

FOREIGN PATENT DOCUMENTS

EP  1890233 A1  2/2008

OTHER PUBLICATIONS

European Patent Office, International Search Report and Written Opinion of the International Searching Authority Mailed Jun. 26, 2014 for PCT International Application No. PCT/RO2013/000017, Filed Oct. 1, 2013.

(Continued)

*Primary Examiner* — Hitesh Patel
(74) *Attorney, Agent, or Firm* — Law Office of Andrei D Popovici, PC

(57) ABSTRACT

Described systems and methods allow a biometric authentication system to process authentication requests, such as requests to authenticate handwritten signatures, received from a plurality of client systems, each covered by a service level agreement (SLA). The biometric authentication system includes a load balancer configured to distribute authentication tasks to a plurality of worker machines. In some embodiments, task distribution is performed according to an ability of each worker to process urgent tasks, to an ability of each worker to process non-urgent tasks, and further according to a relationship between a count of urgent requests and a count of non-urgent requests received by the biometric authentication system.

27 Claims, 9 Drawing Sheets

(56) References Cited

U.S. PATENT DOCUMENTS

| | | |
|---|---|---|
| 2009/0228888 A1 | 9/2009 | Vengerov et al. |
| 2010/0245041 A1* | 9/2010 | Aoki et al. .................. 340/5.82 |
| 2011/0111104 A1 | 5/2011 | Thompson et al. |
| 2011/0265148 A1* | 10/2011 | Tam et al. ......................... 726/4 |
| 2012/0030685 A1 | 2/2012 | Jackson |
| 2012/0079581 A1* | 3/2012 | Patterson ......................... 726/7 |
| 2012/0212459 A1 | 8/2012 | Rusu et al. |
| 2013/0125204 A1* | 5/2013 | La Fever et al. ................. 726/2 |

OTHER PUBLICATIONS

Raviraj Technologies, "eNBio-MAS, AFITS Multiple-authentication Server with Fingerprint," http://web.archive.org/web/20120921095316/http://www.ravirajtech.com/eNBio-MAS.html, RaviRaj Technologies Pvt. Ltd., Pune India; Sep. 21, 2012.

Nivid Biometrics, "Vajra Biometric Online Authentication Solution," http://web.archive.org/web/20120911094804/http://www.nividbiometrics.com/Products/Online_Authentication.asp, Nivid Biometrics Ltd., London UK; Sep. 11, 2012.

QVoice Biometric Security, "QVoice Architecture," http://web.archive.org/web/20110820095903/http://www.qvbiometrics.com/clientserver.html, QVoice Inc., Newton, NJ; Aug. 20, 2012.

BioID, "BioID Web Services (BWS)," http://web.archive.org/web/20120814120510/http://www.bioid.com/products-and-services/bws.html, p. 1-2, BioID AG, Nuremberg Germany; downloaded Aug. 14, 2012.

BioEnable, "eNFAS Authentication Server," http://web.archive.org/web/20120625224350/http://bioenabletech.com/authentication_server_system.htm, BioEnable Technology Pvt. Ltd., Pune India; Jul. 25, 2012.

Ardeun, "Online Biometric Authentication for Multi Factor Web Site Logon," http://web.archive.org/web/20120712082706/http://www.ardeun.com/, Ardeun Biometrics Corporation, Sydney Australia; Jul. 12, 2012.

Hanscan, "Biocryptology Online Biometric Authentication System," http://web.archive.org/web/20120418061335/http://www.hanscan.com/, Hanscan ID Management, Madrid Spain; Apr. 18, 2012.

Nivid Biometrics, "Iron Layer Server," http://web.archive.org/web/20120417165829/http://www.nividbiometrics.com/Products/Iron_Layer_Server.asp, Nivid Biometrics Ltd., London UK; Apr. 17, 2012.

Calsoft Labs, "Biometric Authentication System," http://web.archive.org/web/20120320183748/http://www.calsoftlabs.com/whitepapers/biometrics-technologies.html, Calsoft Labs Pvt. Ltd., Bangalore India; Mar. 20, 2012.

Innoviti, "truesServer: Online Biometric Authentication Server," http://web.archive.org/web/20120212064500/http://www.innoviti.com/trueServer.html, Innoviti Embedded Solution Pvt Ltd, Bangalore India; Feb. 12, 2012.

Aware, "Biometrics Services Platform (BioSP)," http://web.archive.org/web/20120119015659/http://www.aware.com/biometrics/biosp.html, Aware, Inc., Bedford, MA; Jan. 19, 2012.

Wave Systems, "Embassy Authentication Server," http://web.archive.org/web/20110701032124/http://wave.com/collateral/03-000174_EAS.pdf, p. 1-2, Wave Systems Corporation, Lee MA; downloaded Jan. 12, 2012.

Naji et al., "Security Improvement of Credit Card Online Purchasing System," Scientific Research and Essays, 6(16): p. 3357-3370, Academic Journals, Nairobi Kenya; Aug. 19, 2011.

Trevathan et al., "Online Payments Using Handwritten Signature Verification," ITNG '09 Proceedings of the 6th International Conference on Information Technology: New Generations, p. 901-907, IEEE Computer Society, Washington, DC; Apr. 27, 2009.

Shah et al., "On the Design of Adaptive and Decentralized Load-Balancing Algorithms with Load Estimation for Computational Grid Environments," IEEE Transactions on Parallel and Distributed Systems, 18(12): p. 1675-1686, IEEE Press Piscataway, NJ; Dec. 2007.

Trevathan et al., "Remote Handwritten Signature Authentication," ICETE '05 Proceedings of the 2nd International Conference on E-Business and Telecommunication Networks, p. 335-339, INSTICC Press, Setubal Portugal; Oct. 2005.

Zhang et al., "Improving Distributed Workload Performance by Sharing Both CPU and Memory Resources," ICDCS'2000 Proceedings of 20th International Conference on Distributed Computing Systems, p. 233-242, IEEE Computer Society, Washington, DC; Apr. 10, 2000.

Harchol-Balter et al., "Exploiting Process Lifetime Distributions for Dynamic Load Balancing," ACM Transactions on Computer Systems (TOCS), 15(3): p. 253-285, ACM, New York, NY; Aug. 1997.

Sprunt, 'Aperiodic Task Scheduling for Real-Time Systems.,' Ph.D. Dissertation, Department of Electrical and Computer Engineering Carnegie Mellon University, p. 1-210, Carnegie Mellon University Pittsburgh, PA; Aug. 1990.

* cited by examiner

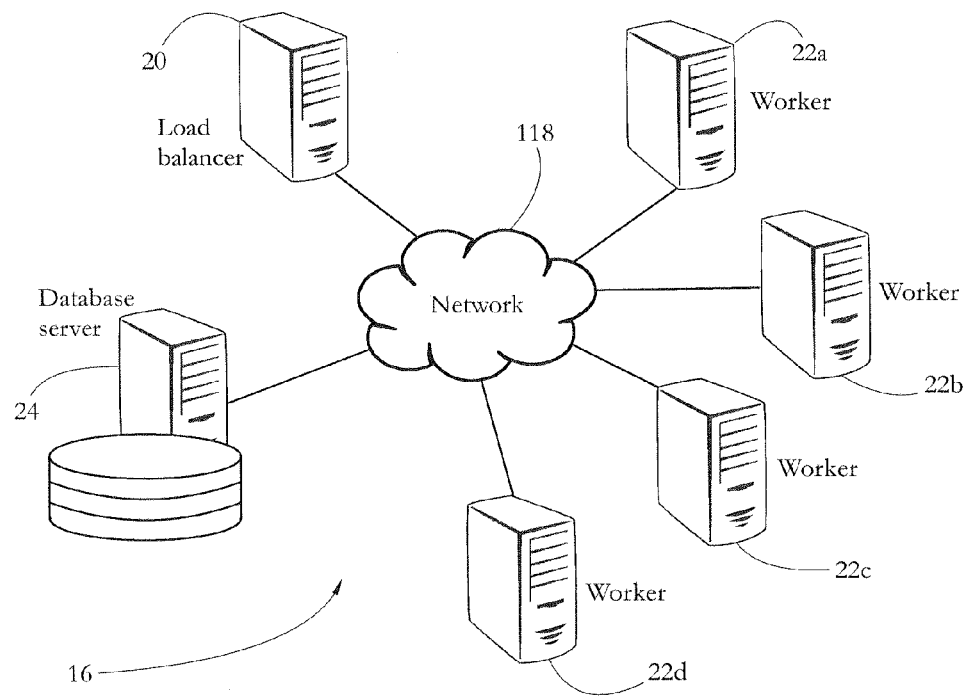
FIG. 2
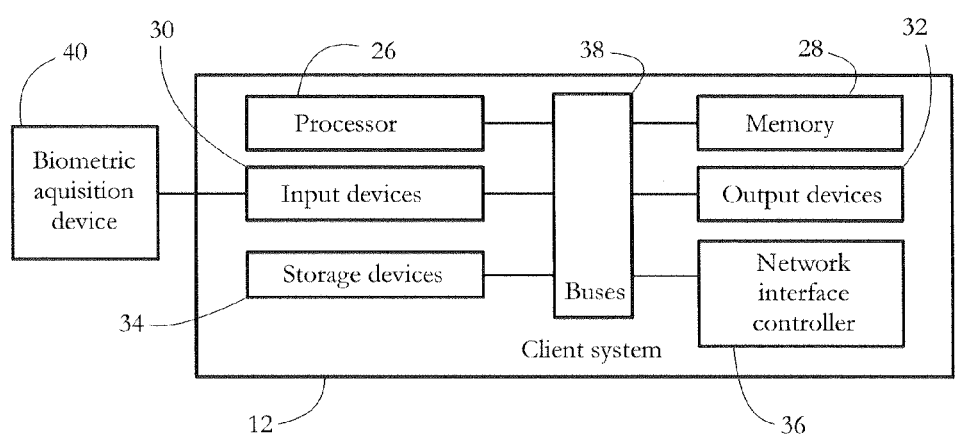
FIG. 3-A

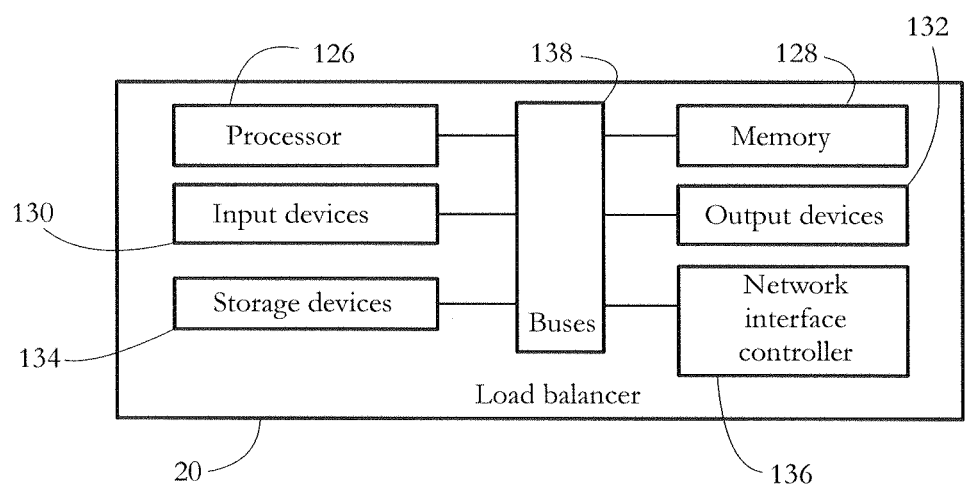
FIG. 3-B
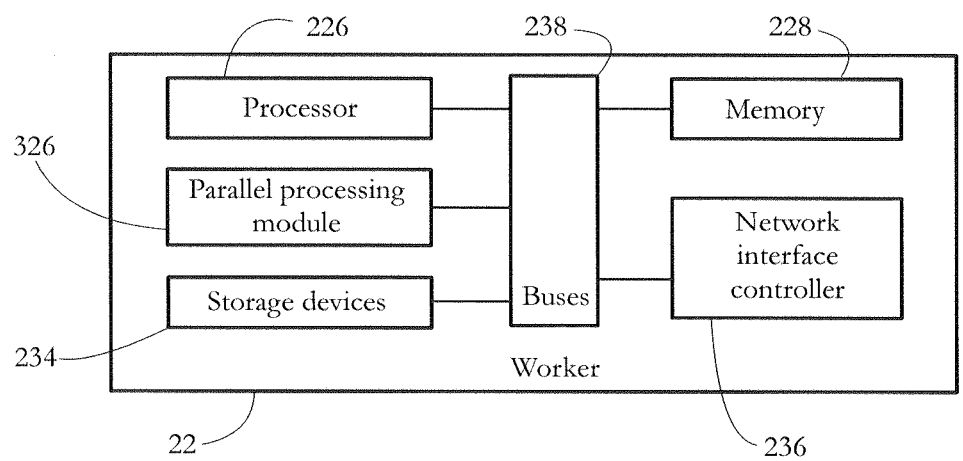
FIG. 3-C

US 8,874,754 B2

LOAD BALANCING IN HANDWRITTEN SIGNATURE AUTHENTICATION SYSTEMS

BACKGROUND

The invention relates to systems and methods for biometric authentication, and in particular to systems and methods wherein such computations are carried out concurrently on multiple machines.

Biometric data, such as facial features, fingerprints, voice features, and handwritten signatures, among others, may be used to authenticate a user for applications such as access control and non-repudiation, among others. Typically, biometric data is uniquely associated to an individual, so such data may be used to verify the identity of the person requesting access to some protected resource. In an exemplary biometric authentication application, to get access to a restricted area of a building, a person may be asked to provide biometric data, e.g., to allow his/her face to be analyzed by an image processing device, or to allow a scanner to collect his/her fingerprint. After verifying the identity of the person, the authentication system may grant the person access to the restricted area. In another example, a user requesting access to a bank account may be asked to input a handwritten signature into a reader. A biometric authentication system may then determine whether the respective signature is associated with an authorized user of the respective bank account, and if so, the system may allow the user to access the bank account.

Common biometric authentication systems compare data collected from a user requesting authentication to a reference record, also known as a template, stored for the respective user. The comparison typically employs pattern recognition and/or machine learning algorithms, such as neural networks, to determine a degree of similarity between the user data and the reference data. Such operations may be particularly computationally intensive.

There is a considerable interest in developing methods and systems capable of performing biometric authentication with low response times, for instance, methods and systems that perform authentication service concurrently, for numerous clients providing a variety of biometric data.

SUMMARY

According to one aspect, a system comprises a load balancer and a plurality of workers, wherein each worker comprises at least one processor configured to process requests to authenticate handwritten signatures, and wherein the load balancer comprises at least one processor configured to accumulate a plurality of requests, each request identifying at least one handwritten signature to be authenticated, the each request received from a client application, wherein accumulating the plurality of requests comprises classifying the each request as urgent or non-urgent according to a service level agreement (SLA) covering the client application. The load balancer is further configured to determine whether an accumulation condition for the plurality of authentication requests is satisfied, and in response, when the accumulation condition is satisfied, for a target request of the plurality of authentication requests, to select a target worker from the plurality of workers according to a first measure of performance of the target worker in processing an urgent request, according to a second measure of performance of the target worker in processing a non-urgent request, and further according to a relationship between a count of accumulated urgent requests and a count of accumulated non-urgent requests, and in response to selecting the target worker, to send the target request to the target worker for processing.

According to another aspect, a client machine comprises at least one processor configured to execute a client application, wherein executing the application comprises sending a target request to a biometric authentication system comprising a load balancer and a plurality of workers, each worker comprising at least one processor configured to process requests to authenticate handwritten signatures, and wherein the target request identifies at least one handwritten signature to be authenticated. Executing the client application further comprises, in response to sending the target request, receiving a response from the biometric authentication system, the response indicative of an authenticity of a user of the client application. The load balancer is configured to add the target request to an accumulating plurality of requests, wherein adding the target request comprises classifying the target request as urgent or non-urgent according to a service level agreement (SLA) covering the client application. The load balancer is further configured to determine whether an accumulation condition for the plurality of requests is satisfied, and in response, when the accumulation condition is satisfied, to select a target worker from the plurality of workers according to a first measure of performance of the target worker in processing an urgent request, according to a second measure of performance of the target worker in processing a non-urgent request, and further according to a relationship between a count of accumulated urgent requests and a count of accumulated non-urgent requests. The load balancer is further configured, in response to selecting the target worker, to send the target request to the target worker for processing.

According to another aspect, a method comprises employing a processor of a computer system to accumulate a plurality of requests to authenticate handwritten signatures, each request of the plurality of requests received from a client application, wherein accumulating the requests comprises classifying the each request as urgent or non-urgent according to a service level agreement (SLA) covering the client application, and wherein the each request indicates at least one handwritten signature to be authenticated. The method further comprises employing the processor to determine whether an accumulation condition for the plurality of requests is satisfied, and in response, when the accumulation condition is satisfied, for a target request of the plurality of requests, employing the processor to select a target worker from a plurality of workers according to a first measure of performance of the target worker in processing an urgent request, according to a second measure of performance of the target worker in processing a non-urgent request, and further according to a relationship between a count of accumulated urgent requests and a count of accumulated non-urgent requests, and in response to selecting the target worker, employing the processor to send the target request to the target worker, the target worker comprising a processor configured to process requests to authenticate handwritten signatures.

BRIEF DESCRIPTION OF THE DRAWINGS

The foregoing aspects and advantages of the present invention will become better understood upon reading the following detailed description and upon reference to the drawings where:

FIG. 2 shows an exemplary authentication cluster comprising a load balancer machine and a plurality of worker machines, according to some embodiments of the present invention.

FIG. 3-A shows an exemplary hardware configuration of a client system according to some embodiments of the present invention.

FIG. 3-B illustrates an exemplary hardware configuration of a load balancer machine according to some embodiments of the present invention.

FIG. 3-C shows an exemplary configuration of a worker machine according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
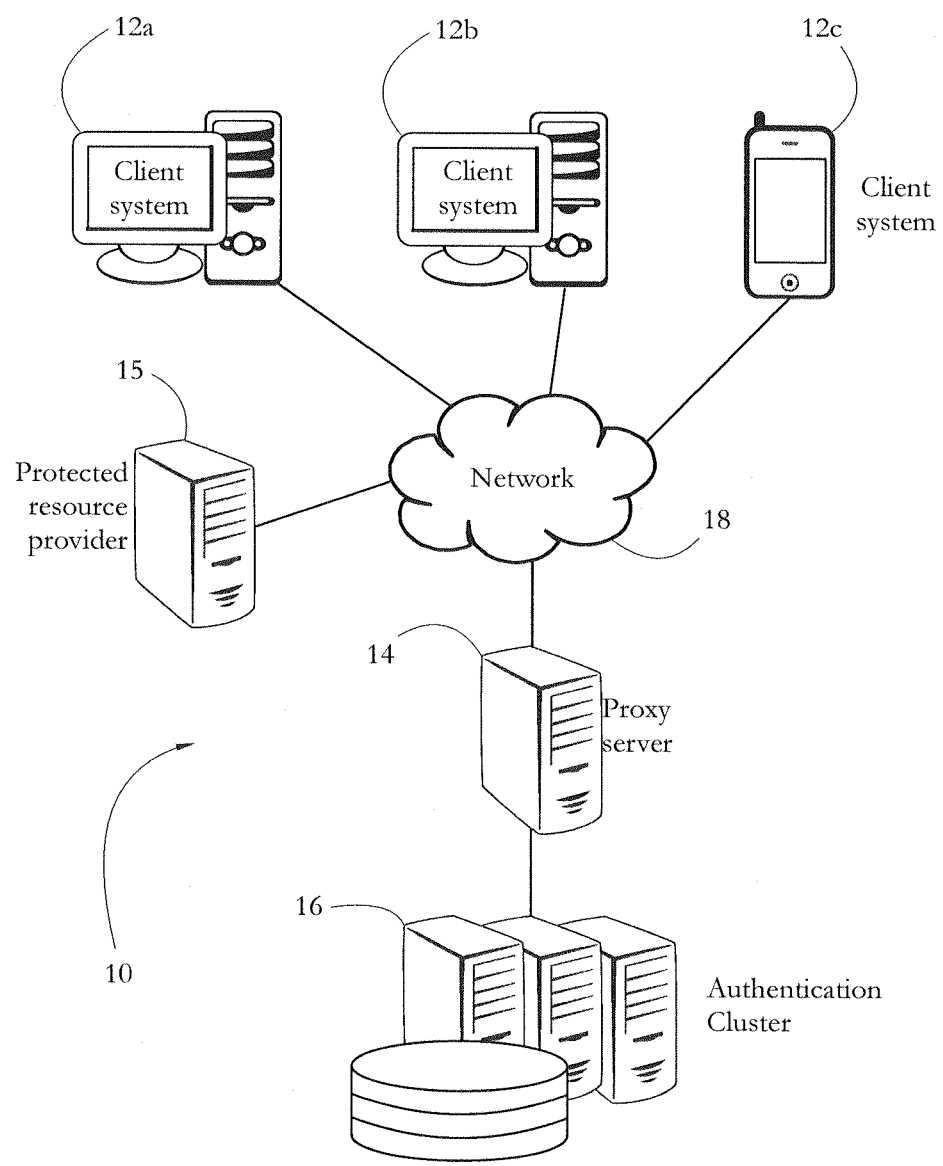
FIG. 1 shows an exemplary biometric authentication system servicing a plurality of clients according to some embodiments of the present invention.

FIG. 1 shows an exemplary biometric authentication system 10 according to some embodiments of the present invention. System 10 comprises an authentication cluster 16 providing centralized identity authentication services for a plurality of client systems 12a-c connected to authentication cluster 16 via a network 18. In some embodiments, system 10 further includes a proxy server 14 connected to cluster 16. The operation of proxy server 14 will be detailed below. In an exemplary embodiment, cluster 16 may represent an authentication service provider, such a security company, receiving authentication requests from a variety of client systems 12a-c.

Client systems 12a-c may represent end-user devices, such as computer systems, telecom devices, and physical access control devices (e.g., building security systems), among others. Client systems 12a-c may represent, for instance, customers of an authentication service provider, such as companies implementing an identity verification protocol to control access of employees and/or clients to some protected area. Each client system 12a-c may represent such a customer, or there may be several client systems 12a-c owned by the same customer. Some systems 12a-c may be used by multiple users. Client systems 12a-c may be physically located together or widely distributed geographically. Network 18 connecting client systems 12a-c to authentication cluster 16 may comprise a wide-area network such as the Internet, and may include a local-area network such as a company Intranet.

In another embodiment, system 10 further comprises a protected resource provider 15, which may be a computer system connected to network 18. Provider 15 may represent an entity, such as a bank, which allows users remote access over network 18 to a protected resource, such as a bank account. In an exemplary authentication scenario, a user of a client system 12a-c may request provider 15 access to the protected resource. In order to grant access, provider 15 may request the respective user to authenticate him/herself. The client system may then collect biometric data from the user and send a biometric authentication request to authentication cluster 16, which may verify the identity of the respective user, and send a response comprising a result of the verification to the requesting client system 12a-c and/or to resource provider 15. Following successful authentication, provider 15 may grant the user access to the protected resource.

FIG. 2 shows an exemplary authentication cluster 16 according to some embodiments of the present invention. Cluster 16 is configured to perform user authentication (e.g., identity verification) at the request of clients 12a-c. In some embodiments, cluster 16 comprises a load balancer 20, a database server 24, and a plurality of workers 22a-d, all connected via a computer network 118. Network 118 may comprise a local area network. The operation of each component of cluster 16 will be detailed below.

FIG. 3-A illustrates an exemplary hardware configuration of a client system 12 of the plurality of client systems 12a-c of FIG. 1, according to some embodiments of the present invention. System 12 represents a computer system for illustrative purposes; other client devices such as telecom devices and physical access control systems may have a different configuration. Client system 12 comprises a processor 26, a memory unit 28, a set of input devices 30, a set of output devices 32, a set of storage devices 34, and a network interface controller 36, all connected by a set of buses 38.

In some embodiments, processor 26 comprises a physical device (e.g. integrated circuit) configured to execute computational and/or logical operations with a set of signals and/or data. In some embodiments, such logical operations are delivered to processor 26 in the form of a sequence of processor instructions (e.g. machine code or other type of software). Exemplary processors 26 include multi-core central processing units (CPU). Memory unit 28 may comprise volatile computer-readable media (e.g. RAM) storing data/signals accessed or generated by processor 26 in the course of carrying out instructions. Input devices 30 may include computer keyboards, mice, and microphones, among others, including the respective hardware interfaces and/or adapters allowing a user to introduce data and/or instructions into system 12. Output devices 32 may include display devices such as monitors and speakers among others, as well as hardware interfaces/adapters such as graphic cards, allowing system 12 to communicate data to a user. In some embodiments, input devices 30 and output devices 32 may share a common piece of hardware, as in the case of touch-screen devices. Storage devices 34 include computer-readable media enabling the non-volatile storage, reading, and writing of software instructions and/or data. Exemplary storage devices 34 include magnetic and optical disks and flash memory devices, as well as removable media such as CD and/or DVD disks and drives. Network interface controller 36 enables system 12 to connect to network 18 and/or to other devices/computer systems. Exemplary controllers 36 include network adapters. Buses 38 collectively represent the plurality of system, peripheral, and chipset buses, and/or all other circuitry enabling the intercommunication of devices 26-36 of client system 12. For example, buses 38 may comprise the northbridge connecting processor 26 to memory 28, and/or the southbridge connecting processor 26 to devices 30-36, among others.

In some embodiments, client system 12 further includes a biometric acquisition device 40 connected to input devices 30. Device 40 is configured to acquire biometric data from a user of client system 12. Exemplary devices 40 include fingerprint scanners and iris scanners, among others. Another exemplary device 40 comprises a pen for recording a handwritten signature, as described in U.S. Pat. No. 7,983,455 by Moise et al., which is hereby incorporated for reference, and wherein an electronic pen is configured to acquire a set of accelerometer readings indicative of a trajectory of a pen as a user executed a handwritten signature. Another exemplary device 40 is described in US patent application 2012/0212459 by Rusu et al., which is hereby incorporated by reference. In the latter example, a self-referential optical navigation sensor acquires a set of relative displacements of the tip of an electronic pen, as the user executes a handwritten signature, the acquisition of the relative movements synchronized with an accelerometer reading.

FIG. 3-B shows an exemplary hardware configuration of load balancer 20 according to some embodiments of the present invention. Load balancer 20 is configured to receive authentication requests from a plurality of clients 12a-c, and to distribute computational tasks related to such requests to worker machines 22a-d. FIG. 3-B shows an individual computer system for illustrative purposes; parts and/or instances of load balancer 20 may operate on multiple computer systems inter-connected by network 118. In some embodiments, load balancer 20 comprises a processor 126, a memory 128, a set of input and output devices 130 and 132, respectively, which may be used to communicate with a human operator, a set of storage devices 134, and a network interface controller 136 connecting load balancer 20 to networks 18, 118. The structure and/or function of components 126-138 may be similar to that of respective components 26-38, shown above.

FIG. 3-C shows an exemplary hardware configuration of a worker 22 according to some embodiments of the present-invention. Each worker 22 is configured to perform computations to process an authentication task received from load balancer 20. Such computations may include comparing biometric data of a user, received from a client system, to a set of user templates; a match may authenticate the identity of the respective user of the client system. In some embodiments, worker 22 may be a computer system comprising a processor 226, a parallel processing module 326, a memory 228, and a network interface controller 236, all connected via a set of buses 238. Processor 226, memory 228, controller 236 and buses 238 may be similar in structure and function to items 26, 28, 36, and 38, respectively.

In some embodiments, module 326 comprises a many-core physical device (microprocessor) distinct from processor 226, and configured to execute computational and/or logical operations with a set of signals and/or data. As opposed to processor 226, the hardware of parallel processing module 326 is optimized to allow the concurrent and independent execution of a large number (e.g, 256) of identical processes and/or instruction threads. Exemplary parallel processing modules 326 include graphics processing units (GPU), among others. Such GPUs may comprise hundreds or thousands of identical processing units (also termed "cores"), typically optimized to execute image-processing operations such as 3-dimensional rendering and pixel shading, among others. GPUs may be programmed to perform computations not related to image processing, for instance to process authentication tasks, among others. In some embodiments, each worker is characterized by a worker-specific thread capacity, a hardware-related quantity indicative of a maximum number (count) of instruction threads that the respective worker 22 may execute concurrently. The thread capacity may be determined according to a processing capacity of processor 226 and/or parallel processing module 326.

Figure 4:
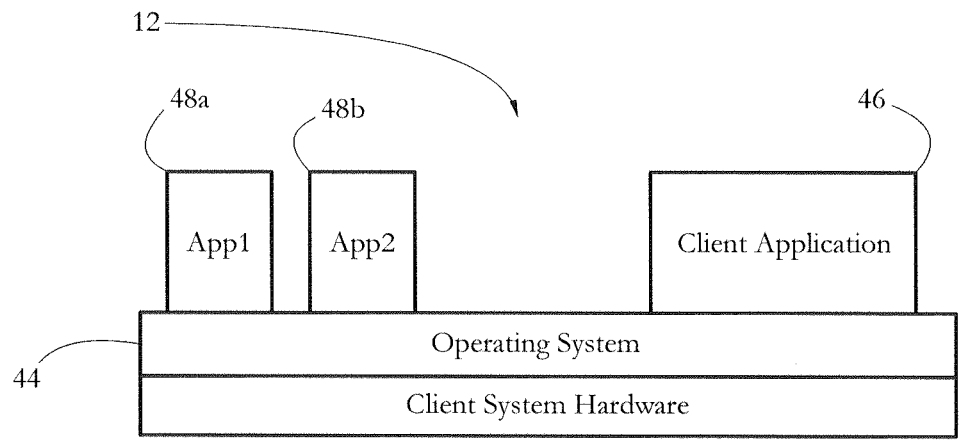
FIG. 4 illustrates an exemplary set of components executing on a client system according to some embodiments of the present invention.

FIG. 4 shows an exemplary software configuration of client system 12 according to some embodiments of the present invention. An operating system (OS) 44 may act as an interface between the client system hardware and a set of applications 46, 48a-b, which may include word processing, image processing, database, browser, and electronic communication applications, among others. OS 42 may comprise an operating system such as Windows®, MacOS®, Linux®, iOS®, or Android™, among others.

A client application 46 executing on client system 12 is configured to perform identity verification/authentication transactions with authentication cluster 16. To carry out such transactions, client application 46 may collect biometric data from a user, by means of biometric acquisition device 40 (for instance an iris scanner or a pen configured to record handwritten signature data). Application 46 may further process and encrypt the respective biometric data and transmit it over network 18 to cluster 16 and/or proxy server 14. In return, client application 46 may receive a response from cluster 16 indicating a result of the requested identity verification.

In some embodiments, client application 46 is further configured to register a set of users with authentication cluster 16. To perform user registration, client application 46 may collect a plurality of specimens, for instance a plurality of handwritten signatures or a plurality of fingerprint scans, from each registered user. Specimens may be transmitted to authentication cluster 16, which may derive a biometric template for each user according to the specimens, the template used for subsequent verifications of the identity of the respective user. Upon registration of each user, cluster 16 may determine a user ID comprising a unique identifier of the respective user, and transmit the user ID to client system 12 executing application 46. In some embodiments, user templates may be updated at any time following user registration.

In some embodiments, application 46 is implemented on client system 12 according to a software development kit (SDK) provided, for instance, by the entity operating authentication cluster 16. Client application 46 may identify itself to cluster 16 using an application ID comprising a unique identifier. Each such application ID may be associated to a specific license and/or to a set of registered users. In some embodiments, multiple client applications may run concurrently on the same client system, each identified by its unique ID, and operating according to its own license.

Authentication transactions between client system 12 and cluster 16 may be conducted according to a mutual agreement, such as a license and/or a service level agreement (SLA) associated to client application 46. In some embodiments, an SLA covering application 46 may specify an average response time of an authentication transaction, a maximum count of authentication transactions carried out per unit time, and a maximum count of registered users of application 46, among others. Authentication cluster 16 may employ load balancing to process authentication requests from client system 12 according to the license/SLA covering application 46.

Figure 5:
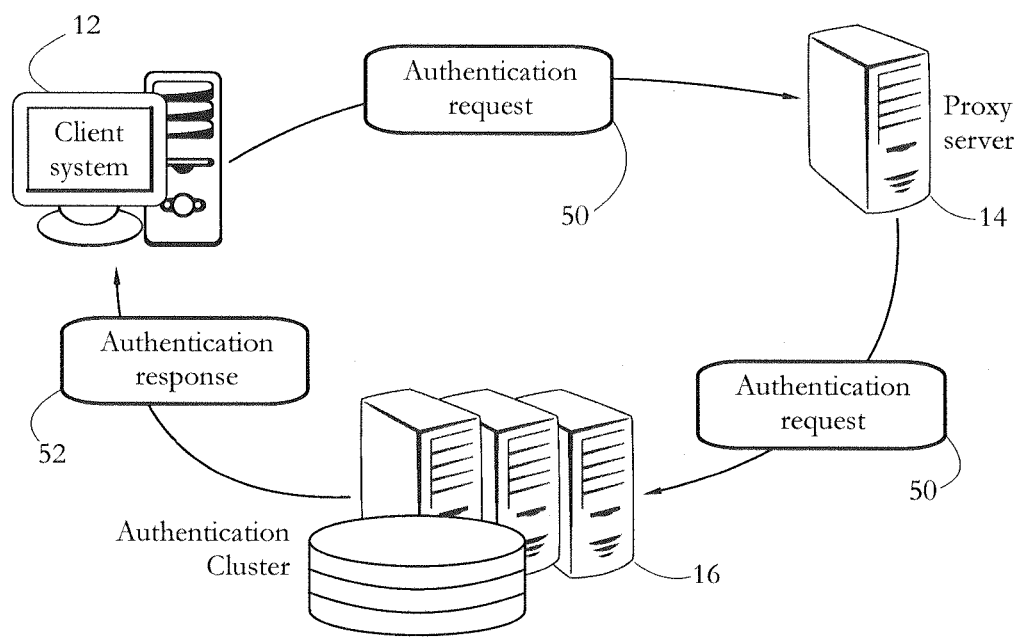
FIG. 5 shows an exemplary data exchange between a client system and the authentication cluster, according to some embodiments of the present invention.

FIG. 5 shows an exemplary data exchange between client system 12 and authentication cluster 16 according to some embodiments of the present invention. To verify the identity of a user, client system 12 may send a biometric authentication request 50 to cluster 16, and receive from cluster 16 an authentication response 52 determined according to request 50, response 52 indicating a result of the authentication (e.g., whether the identity of the user is authentic). In some embodiments, such data exchanges are encrypted and/or are transmitted using secure communication protocols.

In some embodiments, all authentication requests 50 destined for cluster 16 are routed through proxy server 14 (see also FIG. 1). Proxy server 14 is configured to filter biometric authentication requests 50, to determine whether requests 50 are genuine (i.e., submitted by actual users of a registered client application, using a valid security certificate, etc.), before transmitting requests 50 to authentication cluster 16. Such filtering may prevent, for instance, a malicious attack on cluster 16, such as a denial-of-service attack comprising inundating cluster 16 with an overwhelming number of fake authentication requests. In some embodiments, proxy server 14 may also re-formulate requests 50 received from a variety of clients 12*a-c* in a unified format recognized by authentication cluster 50. Authentication response 52 may be transmitted by cluster 16 directly to client system 12 (as illustrated in FIG. 4), or through proxy server 14.

In some embodiments, e.g. when client systems 12*a-c* are distributed over a vast geographical area, authentication system 10 may include a plurality of clusters 16. In such a case, proxy server 14 may be further configured to perform geographical routing, for instance to redirect authentication requests to an authentication cluster according to a geographical location of the requesting client and to a geographical location of the cluster.

Figure 6:
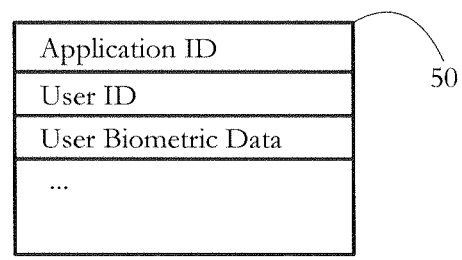
FIG. 6 shows an exemplary set of fields of an authentication request, according to some embodiments of the present invention.

FIG. 6 shows an exemplary format of a biometric authentication request according to some embodiments of the present invention. Request 50 comprises a data structure with multiple fields, including an application ID, a user ID, and a set of biometric data of the respective user, among others. In some embodiments, the application ID comprises an indicator uniquely identifying client application 46 executing on client system 12 requesting authentication. The user ID field of request 50 may comprise an indicator uniquely identifying a registered user of application 46.

In an exemplary embodiment wherein acquisition device 40 comprises a pen configured to record handwritten signatures, the biometric data field of authentication request 50 may comprise a set of accelerometer readings and/or a set of optical sensor readings encoding the signature of the user requesting authentication. In some embodiments, client application 46 may process such data to extract user-identifying features, in which case, the biometric data field may include elements of a feature vector determined for the respective signature. The biometric data field may be formatted according to a standard such as BioAPI 2.0 from the BioAPI Consortium, for example as a Biometric Authentication Record (BIR).

In some embodiments, authentication response 52 comprises a result of an identity verification performed by authentication cluster 16 according to authentication request 50 (FIG. 5). Response 52 may include, for instance, an flag indicating whether the biometric data of request 50 (e.g. handwritten signature) matches the data of a registered user. Response 52 may further comprise elements of a user-specific access policy, indicating for instance that the respective user has access to certain resources, while being denied access to other resources.

Figure 7:
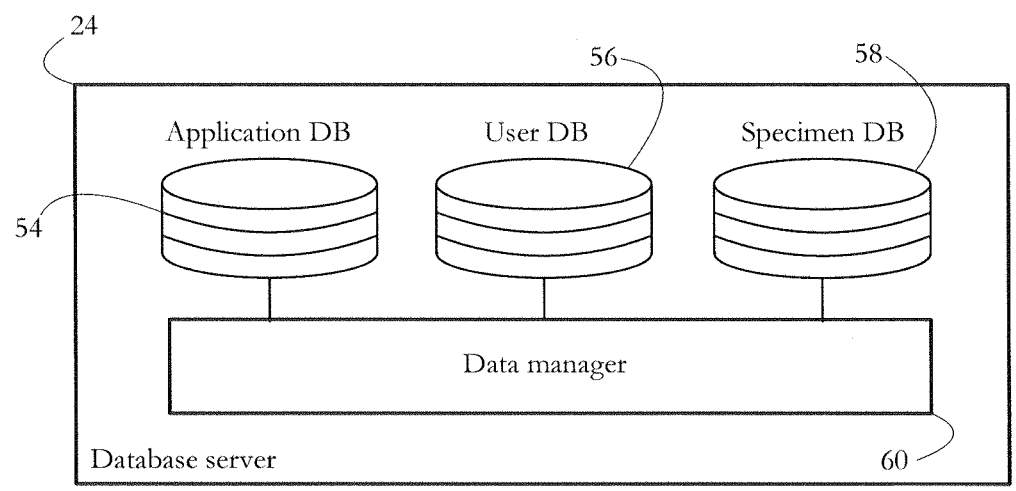
FIG. 7 illustrates exemplary components executing on the database server of FIG. 2, according to some embodiments of the present invention.

FIG. 7 shows an exemplary set of components executing on database server 24 (see FIG. 2) according to some embodiments of the present invention. Server 24 may include a set of computer systems and/or computer-readable media storing data used by various components of authentication cluster 16 in the process of performing identity verifications. In some embodiments, server 24 comprises an application database (DB) 54, a user DB 56, and a specimen DB 58, among others, all connected to a data manager 60. Data manager 60 is configured to selectively retrieve records from databases 54-56-58 at the request of load balancer 20, as described below.

In some embodiments, application DB 54 comprises a set of records, each record including a set of features of a specific client application 46 executing on a specific client system 12*a-c*. Such features comprise license/SLA data, for instance, an average authentication response time, a maximum number of authentication requests honored per unit time, and a maximum number of registered users of the respective application, among others. Other features include an indicator of geographical location of the client system executing the respective application, and other administrative data such as ownership and contact information. In some embodiments, for each application 46, application DB 54 may store a set of statistical and/or historical data, usage patterns (for instance how many requests are received on average from the respective application in various time intervals), average response times, and current number of registered users, among others. Each entry in application DB 54 may be indexed with a unique identifier of the respective application (Application ID).

User DB 56 comprises a set of records, each record including a set of features of a specific user registered with authentication cluster 16. User data may include identity information (name, address, company, etc.), and an indicator of an association with a client application. A user may be simultaneously registered with multiple client applications, as in a situation where a company has multiple access control points, each controlled by a respective client application, and the user may be registered to authenticate at any access control point. In another example, a user may be registered with multiple client application, and use a distinct variant of signature to authenticate with each application. In some embodiments, each user is indexed with a unique identifier (user ID).

Specimen DB 58 includes a set of records, each record including a set of features derived from a biometric specimen provided by a user. In an exemplary embodiment, upon registration with authentication cluster 16, a user may be required to submit a set of biometric specimens, for example a handwritten signature samples or a fingerprint scan. Some embodiments may request multiple specimens per registered user. For each specimen, dedicated modules of client application 46 and/or of authentication cluster 16 may extract a feature vector of values used to perform identity verification of the respective user. Such feature vector values may be stored in specimen DB 58 together with an indicator of an association with the user providing the respective specimen, e.g., a user ID. In some embodiments, all specimen data determined for each user is grouped into a user template of the respective user.

Figure 8:
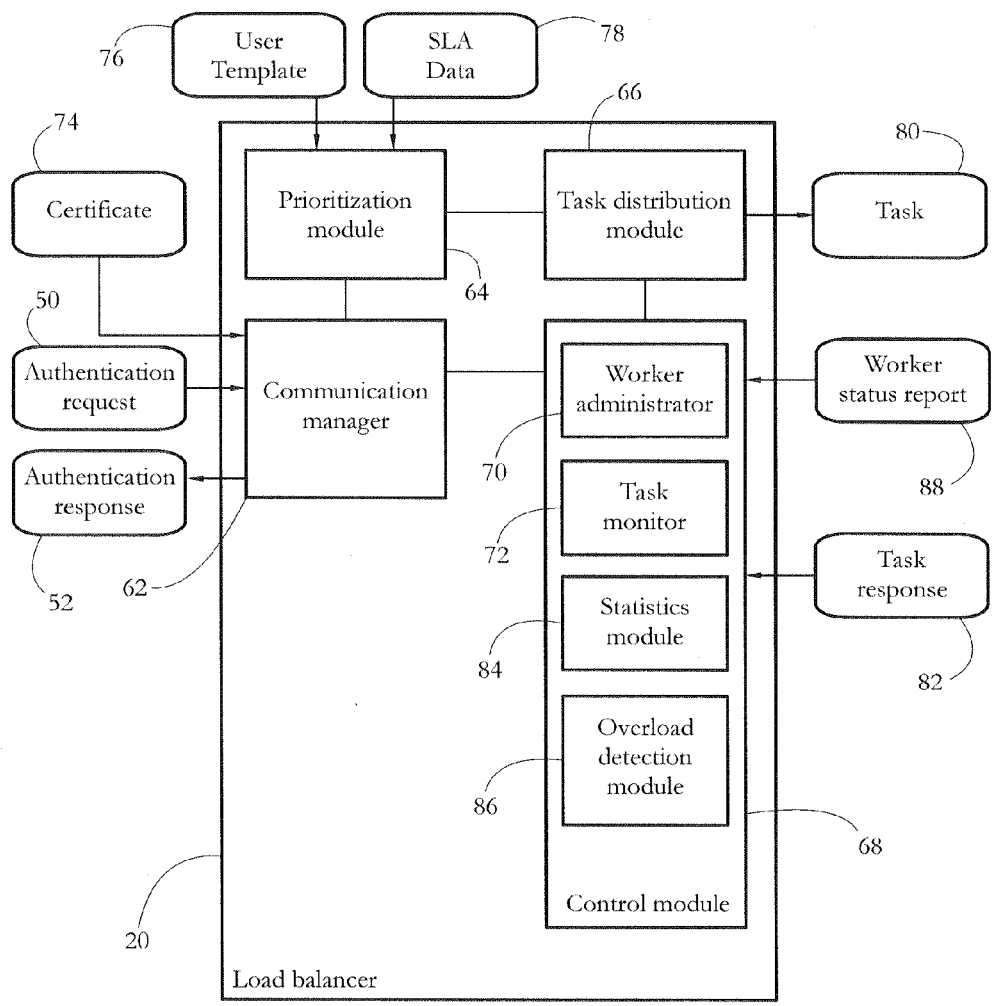
FIG. 8 illustrates exemplary components executing on the load balancer machine according to some embodiments of the present invention.

FIG. 8 shows an exemplary set of components of load balancer 20 according to some embodiments of the present invention. Load balancer 20 (see also FIG. 2) comprises a computer system configured to receive authentication requests from a plurality of client systems 12a-c, to formulate an authentication task according to each received request 50, to distribute such authentication tasks among the plurality of workers 20a-d, and to send a response to each client requesting authentication. In the course of operation, load balancer 20 may interact with database server 24, for instance to request and receive a user template 76 from user DB 56 and/or SLA data 78 from application DB 54, among others.

In some embodiments, load balancer 20 includes a communication manager 62, a prioritization module 64 connected to communication manager 62, a task distribution module 66 connected to prioritization module 64, and a control module 68 connected to task distribution module 66 and manager 62. Control module 68 may further include a worker administrator 70, a task monitor 72, a statistics module 84 and an overload detection module 86, among others.

Communication manager 62 is configured to perform data exchanges with client systems 12a-c, for instance to receive authentication request 50 and send back authentication response 52 to each client requesting authentication (see also FIG. 5). When data traffic between clients 12a-c, proxy server 14, and cluster 16 is encrypted, communication manager 62 may be configured to encrypt, decrypt, and/or verify the integrity of such data traffic using e.g., a certificate 74 received from a cryptographic certification authority. Manager 62 may be further configured to verify the validity of authentication request 50, for instance, to verify whether request 50 is formatted properly and/or whether request 50 originated with a registered client application 46. Additional verification may include checking whether a license of the respective client application has not expired, and determining a privilege level/access policy of the user requesting authentication.

In some embodiments, prioritization module 64 receives authentication request data from communication module 62 and computes a priority for the respective request according to user template 76 and SLA data 78 retrieved from database server 24. Task distribution module 66 is configured to distribute authentication tasks among workers 22a-d (FIG. 2), by transmitting a task 80 to a selected worker. Control module 68 may monitor task execution and perform a set of evaluations of workers 22a-d, as shown below.

Figures 9, 10:
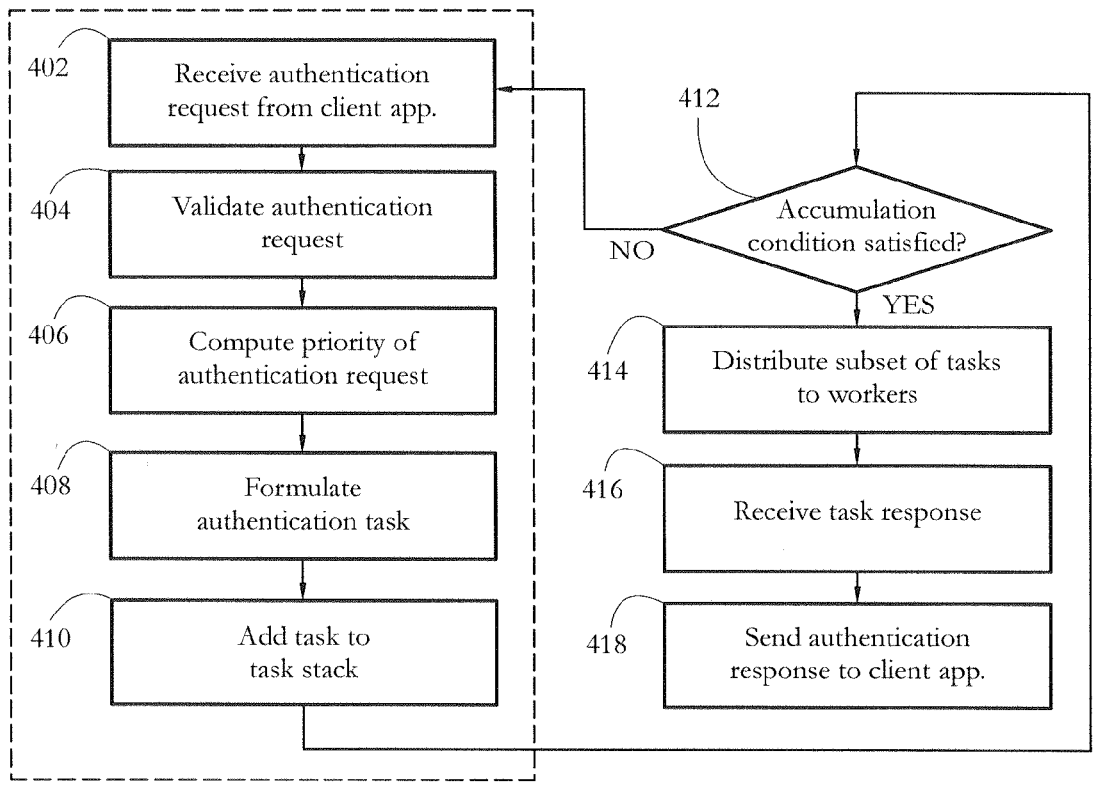
FIG. 9 illustrates an exemplary sequence of steps executed by the load balancer (FIG. 2), according to some embodiments of the present invention.
FIG. 10 shows a set of exemplary data fields of an authentication task, according to some embodiments of the present invention.

FIG. 9 illustrates the operation of load balancer 20 by showing an exemplary sequence of steps executed by load balancer 20 to process authentication requests according to some embodiments of the present invention. A sequence of steps 402-410, illustrated as a dashed rectangle in FIG. 9, may be performed by load balancer for each request 50, independently of other requests. For instance, a plurality of instruction blocks 402-410 may execute concurrently with other such blocks, in a parallel computing configuration, each block processing a distinct authentication request.

In a step 402, load balancer 20 receives authentication request 50 from client system 12. Request 50 is validated in a step 404, to determine for instance whether request 50 originated with a registered application 46. By preventing cluster 16 from wasting computational resources on invalid requests 50, such validation may, for instance, counteract a malicious attempt to disrupt the operation of cluster 16.

Next, in a step 406, prioritization module 64 computes a priority for request 50. In some embodiments, the priority of request 50 is indicative of an order in which request 50 will be processed as compared to other requests received at load balancer 20. Step 406 may comprise retrieving application-specific data and/or user-specific data from database server 24. For example, prioritization module 64 may request data manager 60 to retrieve service level agreement data 78 of the respective client application from application DB 54. Other data requested from database server 24 includes user template 76 retrieved from user DB 56 and/or specimen DB 58.

In some embodiments, prioritization module 64 determines the priority of request 50 so as to satisfy an SLA covering client application 46. Depending on the hardware configuration of authentication cluster 16, requests 50 may be prioritized to ensure that a time spent processing request 50 does not exceed a predetermined average response time specified in the SLA, or to ensure that a predetermined number of authentication requests 50 received from application 46 are processed per unit time, or both. When load balancer 20 receives requests 50 from a plurality of client applications, each application covered by its own SLA, the priority of each request 50 may be determined according to SLAs of all applications submitting requests. For instance, requests 50 received from client applications 46 covered by SLAs specifying a short response time (or a large number of requests processed per unit time) may be given priority over requests received from other applications with less stringent response time and/or requests per unit time specifications.

In some embodiments, module 64 determines the priority of request 50 according to the formula:

$$P[j] = \alpha \frac{T_{min}}{T[i]} + \beta \frac{N[i]}{N_{max}}, \qquad [1]$$

wherein P[j] denotes the priority of request j received from client application i, T[i] denotes an average response time specified by the SLA covering application i, N[i] denotes a number of requests from application i honored per unit time, specified by the SLA, and wherein $T_{min}$ denotes a lower bound on T[i], while $N_{max}$ denotes an upper bounds on N[i], respectively, the bounds evaluated over all applications i covered by currently active SLAs. When using Eqn. [1], low P[j] values indicate higher scheduling priority (e.g., requiring speedier processing). In eqn. [1], α and β are weight factors, e.g. with values between 0 and 1. Higher α values give more prioritizing weight to a response time criterion, while higher β values emphasize number of requests processed per unit time as a scheduling criterion. Exemplary values α=0.7, β=0.3 have been used in testing; such values are hardware and/or implementation specific, and may be determined by experiment. Optimal weight factors may be determined according to statistical and/or historical data collected by load balancer 20.

In some embodiments, module 64 may further prioritize requests 50 according to an identity of a user submitting the respective request. For instance, client application 46 may declare a set of user groups, wherein each user group and/or member of a user group may be covered by distinct SLA specifications. Such embodiments may differentiate not only among multiple client applications, but also among multiple users of the respective applications. In such cases, module 64 may use an exemplary formula:

$$P[j] = \alpha \frac{T_{min}}{T[i]} + \beta \frac{N[i]}{N_{max}} + \delta P_{group}[i], \quad [2]$$

wherein the notation is the same as for Eqn. [1], and wherein $P_{group}[i]$ denotes a group-specific priority parameter pre-determined for a user group including the us submitting request 50, while δ is a weight factor. In some embodiments, weight factors α, β, δ are chosen so that Eqn. [2] does not yield a value P[j] lower than a value determined for the same originating application i using Eqn. [1]. Such parameter adjustments should prevent a user of an application i from gaining a scheduling advantage beyond that afforded by the SLA covering application i. Meanwhile, distinct users of application i may receive distinct request priorities. An exemplary set of values includes α=0.6, β=0.2, δ=0.2.

In a step 408 (FIG. 9), load balancer 20 formulates an authentication task 80 according to request 50, SLA data 78, and user template 76, among others. In some embodiments, task 80 comprises a data structure used as input to a selected worker 22. Each authentication request 50 may generate a corresponding task 80. FIG. 10 shows an exemplary set of fields of task 80 according to some embodiments of the present invention; the ordering of data fields is illustrative. Task 80 includes the priority calculated in step 406, the user biometric data collected from the user as part of request 50, and the template biometric data stored for the respective user in user DB 56 and/or specimen DB 58. In some embodiments, task 80 further includes a task type flag indicative of a type of task (e.g., user authentication vs. user registration), and a timestamp indicative of a moment in time when request 50 was sent by the respective client system and/or when request 50 was received at load balancer 20. Task 80 may further include an urgency flag, indicating whether request 50 is urgent, and a complexity indicator, among others.

In some embodiments, the complexity indicator is indicative of a computational complexity of task 80. Computational complexity may vary among tasks, according to a complexity of the biometric data being processed, and according to a complexity of the algorithms used to perform identity verification. For instance, handwritten signature data may vary in complexity, from users having simple signatures to users having rather elaborate signatures. Such complexity may be quantified by a count of features of a feature vector representing each specimen; elaborate signatures may be described by longer feature vectors than simple signatures.

In some embodiments, task complexity may be quantified according to task processing time. A plurality of complexity classes may thus be defined, and individual tasks may then be placed into the appropriate complexity class according to the time necessary for processing the respective task. Such data may be gathered by a component of cluster 16, such as statistical module 84.

In some embodiments, in a step 410 (FIG. 9), load balancer 20 places task 80 in a task stack maintained by control module 68 using any of a number of stack/queue management techniques known in the art. As part of step 410, the stack may be ordered according to task priority and/or other criteria. Tasks may accumulate in the stack until an accumulation condition is satisfied. Exemplary accumulation conditions include determining whether a predetermined time period has elapsed since the latest task distribution to workers, and/or determining whether a count of tasks in the stack has reached a predetermined threshold. In a step 412, load balancer determines whether the accumulation condition is satisfied, and if no, returns to step 402.

When the task accumulation condition is satisfied, in a step 414, task distribution module 66 selects a subset of tasks from the stack and distributes them to workers 22a-d. An exemplary operation of module 66 is given below. Next, in a step 416, for each task 80 forwarded to a worker machine, control module 68 may receive from the worker machine a task response 82 indicating a result of processing the respective task. In a step 418, load balancer 20 formulates authentication response 52 according to task response 82, and employs communication manager 62 to transmit response 52 to the respective client application 46.

Figure 11:
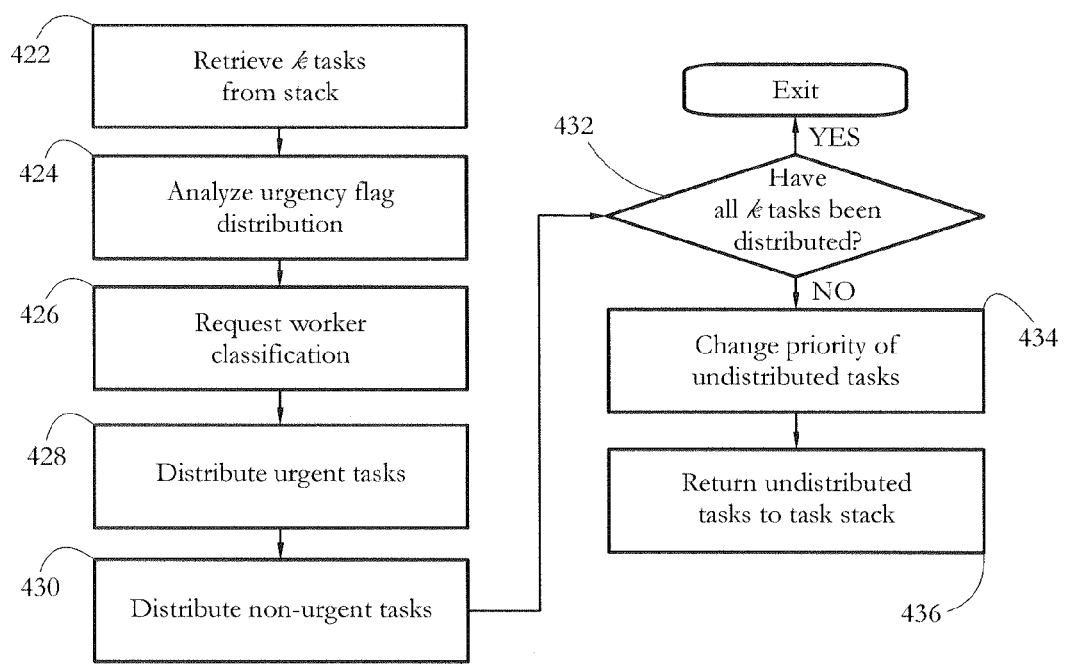
FIG. 11 shows an exemplary sequence of steps performed by the task distribution module of the load balancer (FIG. 7), according to some embodiments of the present invention.

FIG. 11 shows an exemplary sequence of steps executed by task distribution module 66 to distribute tasks to workers (step 414 in FIG. 9), according to some embodiments of the present invention. In a step 422, module 66 may extract k tasks from the task stack maintained by control module 68. In some embodiments, the k tasks are selected according to a task-specific priority computed by prioritization module 64 (see above). In some embodiments, task selection is performed according to additional criteria, for instance, for a given application i, module 66 may extract in each time period a number of tasks corresponding to application i, the number not greater than a maximum number of requests honored within the respective time period, as specified in the SLA covering the respective application i.

Also, in some embodiments, module 66 may extract from the stack tasks corresponding to a plurality of client applications, proportionally with the number of tasks each application i currently has in the stack. For instance, if the stack currently holds $N_1$=900 tasks submitted by application $A_1$, and $N_2$=100 tasks submitted by application $A_2$, then we may find the proportionality $N_1/N_2$ also in the subset of tasks extracted by module 66 in step 422 (e.g, the subset may comprise 90 tasks from $A_1$ and 10 tasks from $A_2$). Such task selection criteria may encourage a fair processing of requests coming from multiple applications, by not granting certain applications excessive scheduling priority over other applications, irrespective of the request priorities computed by module 64.

In some embodiments, the number (count) k of tasks extracted in step 422 is pre-determined according to processing capabilities of load balancer 20 and/or worker machines 22a-d. For example, it may not be desirable to extract a number k greater than a number of tasks the available workers can process concurrently at the time of distribution. On the other hand, a low value k comes with an extra computational penalty of having to perform task distribution more frequently than for large values of k.

In a step 424, module 66 analyzes a distribution of urgency flags within the extracted set of tasks. In some embodiments, each task 80 includes an urgency flag indicating whether the respective task is urgent or not (see also FIG. 10). The urgency flag of a task may de determined according to a time remaining until the expiration of the respective task. In some embodiments, a task may be deemed expired when an estimated time interval necessary to process the respective task exceeds a time interval remaining until a threshold determined according to the respective SLA (for instance, if a task is 0.9 seconds old and it necessitates 0.2 seconds for processing, and if the SLA specifies an average response time of 1.0 seconds for the respective task, the task may be deemed expired). In some embodiments, tasks are deemed urgent when they expire sooner than a predetermined time threshold, e.g., 500 milliseconds, and non-urgent otherwise. The threshold may be determined according to a hardware configuration of authentication cluster 16, according to performance measures, and/or according to historical or statistical data. For instance, the threshold may be determined according to an average and/or median response time of workers 22a-d.

In a step 426, distribution module 66 requests a classification of workers 22a-d according to a measure of performance indicating the ability of each worker to process urgent and non-urgent tasks. Such classification may be carried out by worker administrator 70 of control module 68, according to a composition of the set of tasks retrieved in step 422. In some embodiments, the composition of tasks includes a relationship between a count of urgent tasks and a count of non-urgent tasks within the respective set (e.g. a ratio of the count of urgent tasks to the count of non-urgent tasks). Worker administrator 70 may return two ordered lists, a first list comprising a set of identifiers of workers 22a-d, ordered according to the ability of the respective workers to process urgent tasks, and a second list comprising a set of identifiers of workers 22a-d, ordered according to the ability of the respective workers to process non-urgent tasks. The operation of worker administrator 70 will be further detailed below.

In a step 428, module 66 may distribute urgent tasks of the set of tasks to workers 22a-d according to a content of the first list determined in step 426, and further according to an availability of said workers to process tasks at the moment of task distribution. In some embodiments, a worker is deemed available when the respective worker is functional, when it has spare capacity to process tasks (e.g., when only a subset of processor cores are currently processing authentication tasks), and when the memory loading of the respective worker does not exceed a predetermined threshold.

To distribute urgent tasks, module 66 may select workers from the first list, in the order of decreasing ability to process urgent tasks, check the respective workers' availability, and when they are available, transmit urgent tasks to the respective workers. When selected workers can process several tasks in parallel, for instance when selected workers comprise parallel processing modules 326 (see FIG. 3-C), module 66 may send multiple tasks to the same worker. When sending multiple tasks to the same worker for parallel processing, module 66 may select tasks having substantially similar levels of computational complexity (for a discussion on complexity, see above, in relation to FIG. 10). For instance, module 66 may determine a distance between a complexity measure of a first task and a complexity measure of the second task, and determine that the first and second tasks have substantially similar levels of complexity when the distance is less than a predetermined threshold. Exemplary complexity measures include task processing times, among others.

Task distribution may further consider that memory constraints are typically more stringent for parallel processing than for single-core processing. Each process executing in parallel may take up a substantial amount of memory, so depending on the current loading of the respective worker, sending multiple tasks may not be possible because of insufficient available memory on the respective worker.

Next, in a step 430, module 66 may distribute non-urgent tasks of the set to workers 22a-d according to a content of the second list determined in step 426, and further according to an availability of said workers to process tasks at the moment of task distribution. By processing urgent tasks ahead of non-urgent tasks, load balancer 22 may not only process the task stack efficiently, but may also prevent urgent tasks to return to the task queue, as shown below. To distribute non-urgent tasks, module 66 may select workers in the order of decreasing ability to process non-urgent tasks, check the respective workers' availability, and when they are available, transmit urgent tasks to the respective workers.

A step 432 may determine whether all tasks extracted in step 422 have been distributed to workers, and if yes, module 66 may exit. When not all tasks have been distributed, in a step 434, module 66 may update the priority indicators of tasks left undistributed after steps 422-430. An exemplary update comprises replacing P[j] a μ·P[j] (see e.g. Eqns. [1-2]) with μ=0.9 for instance, to reflect the fact that the respective task j should receive higher scheduling priority the next time it is selected for distribution. In a step 436, distribution module 66 may return undistributed tasks, with updated priority indicators, to the task stack.

In some embodiments, worker administrator module 70 performs the classification of workers 22a-d according to the current set of tasks retrieved in step 422, and according to the current workers' ability to process urgent and non-urgent tasks. Such classification may comprise ranking workers 22a-d, for instance according to a score computed for each worker, the score indicative of a measure of performance of the respective worker in processing urgent and/or non-urgent requests. In some embodiments, the score of a worker is computed according to the following indicators, among others:

a) a memory capacity of the respective worker;
b) a number (count) of authentication tasks currently executing on the respective worker;
c) a thread capacity of the worker, indicative of a maximum number of authentication tasks that the respective worker may process in parallel;
d) response times indicative of a time consumed by the respective worker to process authentication tasks. Various response times may be recorded for each user, corresponding to tasks belonging to various complexity classes and processor loads.
e) a stability indicator, indicative of a degree of confidence that the respective worker will complete the processing of a task in a time substantially equal to that listed above, under d), and will not abort or otherwise compromise the processing of the respective task. The worker stability may further indicate a degree of confidence that the respective worker will not alter its load by taking on computer tasks not related to authentication. In some embodiments, the stability indicator may be determined according to historical data, e.g., to a historical success rate of the respective worker, or to a statistic of tasks completed and/or aborted by the respective worker in a pre-determined time period.

Such data may be gathered by worker administrator 70 and/or statistics module 84 in two stages: upon launching a worker machine, and during operation of the respective worker. In some embodiments, each worker may send a status report 88 to worker administrator 70 (FIG. 8) at various times during operation, the report including current values of performance parameters of the respective worker, such as used memory and spare thread capacity (number of cores/threads currently available to process tasks), among others. Status reports 88 may also be sent following performance incidents, such as crashes or other malfunctions of the respective worker or of a task executing on the respective worker.

Figure 12:
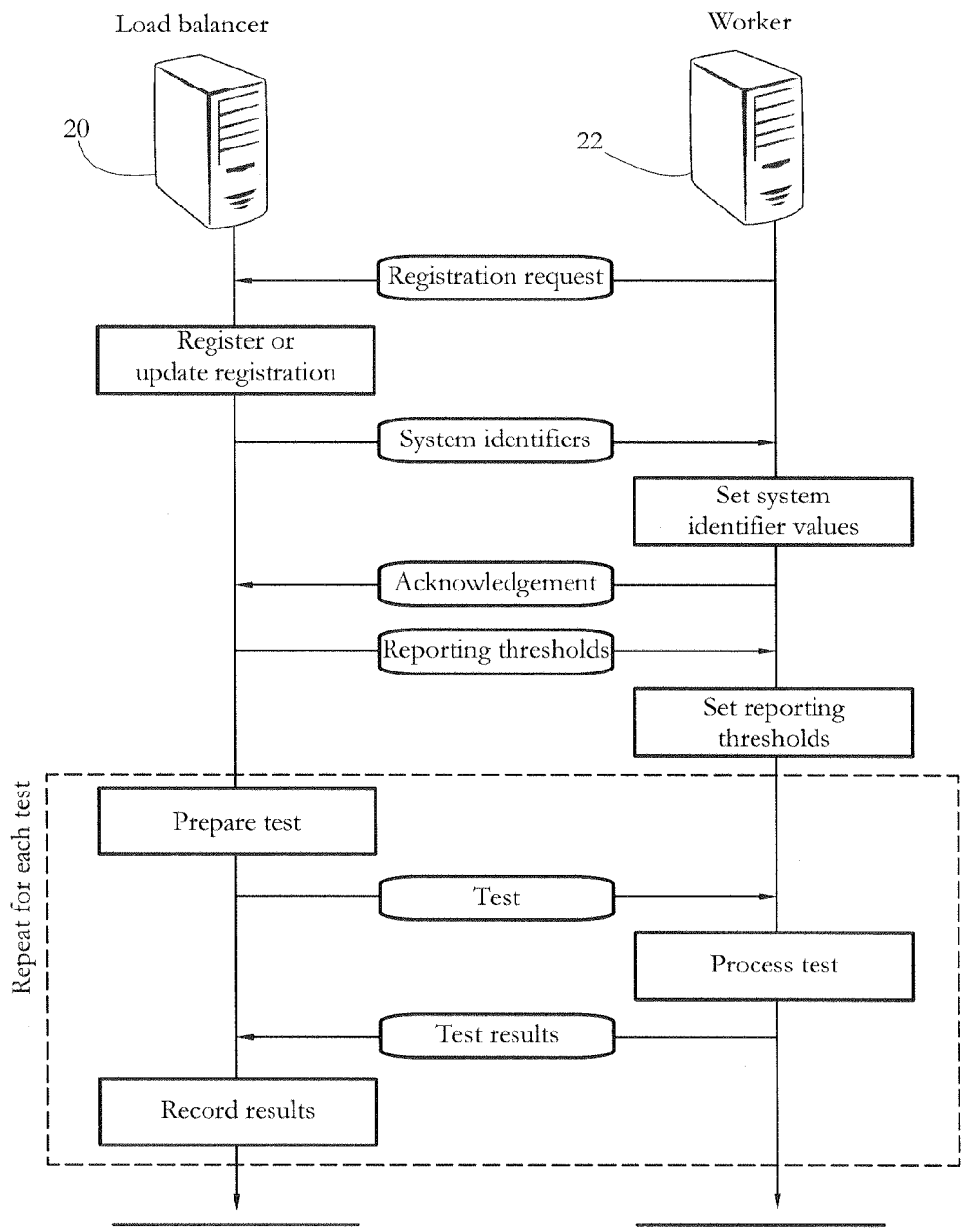
FIG. 12 shows an exemplary exchange between the load balancer and a worker, performed upon initialization of the respective worker, according to some embodiments of the present invention.

FIG. 12 shows an exemplary data exchange between a worker and administrator 70 upon start-up and registration of the worker with load balancer 20. When worker 22 initializes, load balancer 20, e.g., via worker administrator 70, may receive a registration request from worker 22, including a set of features of the respective worker, such as a total memory and a number of processing cores, among others. Load balancer 20 may register the worker machine, determine a set of system identifiers of the worker (e.g., unique IDs for each processing core of worker 22), and transmit the system identifiers to worker 22. Worker 22 may subsequently set the respective identifiers and acknowledge the receipt. Load balancer 20 may then determine a set of reporting thresholds and send the thresholds to worker 22. Reporting thresholds may refer to specific processor and/or memory load thresholds. In some embodiments, worker 22 is configured to signal to load balancer 20 whenever a property of the worker, such as occupied memory, or processor load, exceeds such thresholds (e.g., 30%, 60% and 90% of maximum values).

Following worker registration, worker administrator 70 may send a set of tests to worker 22 to determine the ability of worker 22 to process tasks in various configurations. Test may include typical authentication tasks, formulated for various complexity classes. When worker 22 can process tasks in parallel, tests may include sending variable numbers of concurrent tasks to worker 22. For each test, statistics module 84 may record a result of the test, to gather a representative response time statistic for the respective worker. In some embodiments, worker administrator 70 is configured to re-test each worker at pre-determined time intervals, to maintain up-to-date statistics of response times at various worker loads.

Statistics module 84 may be configured to update statistical data, such as average response times of various workers, according to a schedule. For instance, module 84 may continuously register response times of each worker, differentiated by task complexity and worker load, and execute a periodic update (e.g., every two minutes) of the statistics for the respective workers to reflect the current system performance.

In some embodiments, when ranking workers according to their ability to process urgent tasks, the following cases may occur:
a) Urgent tasks form the majority of the current set of tasks retrieved by task distribution module 66 in step 422 (FIG. 11). In such a case, worker administrator 70 may assign high scores to workers characterized by high spare capacity (number of cores/threads currently available for processing tasks), low response time, and high stability. Stable workers may be preferable since urgent tasks typically do not allow re-scheduling.
b) Non-urgent tasks form the majority of the current task set. In such cases, worker administrator 70 may assign high scores to workers characterized by low spare capacity, low response time, and high stability.

When ranking workers according to their ability to process non-urgent tasks, the following cases occur:
c) When urgent tasks form the majority of the current task set, administrator 70 may assign high scores to workers having low spare capacity, high response time, and/or low stability. Choosing workers with comparatively low performance for processing non-urgent tasks may keep higher-performing workers free for potential computationally-intensive jobs.
d) When non-urgent tasks are in the majority within the current task set, administrator 70 may assign high scores to workers with high spare capacity, average response time, and low stability.

In some embodiments, to achieve the scoring corresponding to each of the four cases a)-d) outlined above, three performance indicators are determined for each worker. A first performance indicator $P_1$ is determined as a ratio between the current spare capacity of the worker and the thread capacity of the worker. A second performance indicator $P_2$ is determined as a ratio between the lowest response time of all workers and the average response time of the respective worker. A third performance indicator $P_3$ comprises the stability of the worker, expressed as a ratio between a count of tasks successfully processed by the worker and a total count of tasks submitted to the worker.

In some embodiments, a score indicating the ability of the worker to process urgent tasks may be computed according to $P_1+P_2+P_3$ when urgent tasks dominate, and according to $(1-P_1)+P_2+P_3$ when non-urgent tasks dominate. A score indicating the ability of the worker to process non-urgent tasks may be computed according to $(1-P_1)+(1-P_2)+(1-P_3)$ when urgent tasks dominate the task set, and according to $P_1+P_2+(1-P_3)$ when non-urgent tasks dominate.

In some embodiments, worker administrator 70 may be further configured to collaborate with task distribution module 66 to re-distribute tasks, which failed to process because of e.g., a crash or other malfunction of the respective worker. Task monitor 72 of control module 68 may continuously monitor the progress of authentication tasks. When monitor 72 does not receive a task response 82 within the expected response time estimated for the respective worker and task, distribution module 66 may decide to redistribute the respective task to another worker. In some embodiments, task monitor 72 is configured to wait for a time interval longer than the expected response time, before deciding that a given task has failed. To redistribute the failed task, module 66 may request a worker classification from worker administrator 70. In some embodiments, worker administrator 70 may return an ordered list of workers, ranked according to their ability to process the task requiring redistribution. In such situations, worker administrator 70 may assign high scores to workers having low response time and high stability. Such choices may prevent the respective task from failing again.

In some embodiments, statistics module 84 is further configured to record and analyze other indicators of the performance of authentication cluster 16, beside worker response times, such as a time spent by various components of cluster 16 on administrative tasks, e.g. task prioritization, overload detection, task rescheduling, and communication with client systems, among others. Module 84 may also record historical usage patterns of cluster 16. For instance, for each client system and/or each client application registered with authentication cluster 16, module 84 may record a number of authentication requests received from the respective application, differentiated by hour and/or day of the week, and/or a record of incidents when authentication requests were not honored within the parameters of the SLA.

If, during operation, cluster 16 becomes overloaded with authentication requests, some embodiments of load balancer 20 may switch to a mode of operation distinct from the one described above in relation to FIGS. 9 and 11. Overload describes a situation in which cluster 16 cannot process all tasks of the task stack so as to satisfy all SLAs covering tasks in the stack. In some embodiments, overload detection module 86 of load balancer 20 (FIG. 8) is configured to detect an overload situation and to signal to task distribution module 66. To detect overload, module 86 may estimate a time necessary to process all tasks in the task stack, using statistical data available for workers 22a-d, and considering particularities of the respective tasks, such as task complexity and SLA specifications. The respective time estimate is then compared to an estimate calculated using SLA data. Such an exemplary comparison is given below:

$$\sum_{i=1}^{\#A} \sum_{j=1}^{N_{max}^i} t[j]_{statistic} \geq \sum_{i=1}^{\#A} \sum_{j=1}^{N_{max}^i} t[i]_{SLA} + T_C, \quad [3]$$

wherein #A denotes a count of client applications having requests in the current stack, $t[j]_{statistic}$ denotes the average response time for task j, determined from statistical data collected from tasks in the same complexity class as task j, wherein $t[i]_{SLA}$ denotes an average response time specified in the SLA covering application i, wherein $N_{max}^i$ denotes a maximum count of tasks processed for application i during the current time interval (e.g., the smaller between the count of tasks from application i currently in the stack, and the maximum number of requests honored per unit time, as specified in the SLA covering the respective application), and wherein $T_C$ denotes a time necessary for execution of control routines of load balancer 22, such as routines executed by worker administrator 70, task monitor 72, and statistics module 84, among others.

When the comparison in Eqn. [3] yields true, indicating overload, task distribution module 66 may switch to a mode of operation implementing an equitable degradation of licenses. In some embodiments, equitable degradation may comprise ensuring that each task may exceed the response time specified in the respective SLA by approximately the same amount of time.

In some embodiments, equitable degradation is achieved by proportionally increasing the response time for each client application having tasks in the stack, e.g. by 5%. For instance, if an SLA specifies an average response time of 1000 ms, then cluster 16, when executing in overload, may temporarily increase the average response time for processing requests covered by the respective SLA to 1050 ms. The percent increase in average response times may be further increased and/or decreased iteratively until the overload is eliminated.

Alternatively, an equal proportion of tasks may be left unprocessed for each user application having tasks in the stack. Task distribution module 66 may proportionally reduce the number of requests processes for each client application per unit time, e.g., by 5%. For instance, when an SLA specifies a maximum of 100 authentication requests per minute, cluster 16 may temporarily reduce the number of authentication requests covered by the respective SLA to 95 per minute.

When the load of cluster 16 exceeds a critical threshold, some embodiments of load balancer 20 may refuse additional authentication requests, and may send a "server busy" response to the requesting client system.

The exemplary systems and methods described above enable a centralized biometric authentication system to process of a real-time stream of biometric authentication requests, received from a plurality of distributed client systems. Exemplary biometric authentication requests include identity verification requests for applications such as access control and non-repudiation, among others. In some embodiments, identity verification is processed according to a sample of biometric data collected from a user of a client, such as a handwritten signature or a fingerprint scan.

In some embodiments, a load balancer executing on a centralized server system receives heterogeneous authentication requests from clients and distributes tasks to a plurality of worker machines. To verify the identity of the user, each worker machine may be configured to compare the biometric data received from the user to a user-identifying template of biometric data. A match may confirm the identity of the user. Such comparison algorithms may be computationally intensive.

In some embodiments, each client of the biometric authentication system executes a client application configured to collect biometric data and to perform remote data exchanges with the authentication system. Client applications may be customized for each client according to an SDK provided by the authentication system; such solutions may provide clients with flexibility, while controlling costs. In some embodiments, each client application is covered by a license and/or service-level agreement, indicating an agreed average response time and/or an agreed limit of the number of authentication requests from the respective application, processed per unit time, among others.

In some embodiments, load balancing is formulated to simultaneously satisfy a plurality of SLAs, each SLA covering an authentication request currently being processed by the system. In some embodiments, tasks are divided in urgent and non-urgent, according to requirements of the respective SLAs. Urgent tasks may be distributed to workers before non-urgent tasks, to avoid rescheduling of urgent tasks. When the system becomes overloaded with authentication requests, some embodiments allow for an equitable degradation of license agreements, comprising a proportional increase in the response time and/or a proportional decrease in the number of processed requests, for all applications currently having requests in processing.

Conventional task distribution systems typically send tasks to workers according to an order in which the respective tasks were received at the distributing unit, and/or according to hardware parameters of worker machines, such as processor speed and memory capacity. By contrast, some embodiments of the present invention rank each worker machine using two distinct scores: one score indicative of an ability of said worker to process urgent tasks, and another score indicative of an ability of said worker to process non-urgent tasks. The respective abilities may be evaluated not only according to hardware features of the respective worker, but also according to a current response time of the respective worker, according to a stability indicative of a confidence that the respective worker will successfully process the task, and further according to a computational complexity of the task.

In some embodiments, performance parameters of each worker, such as spare computing thread capacity and available memory, are evaluated in near real time, by collecting a statistic of response times of the respective worker in processing a variety of recent tasks; task distribution actively using such current information may utilize hardware resources in a more efficient way.

In some embodiments of the present invention, workers are configured to process a plurality of authentication tasks in parallel, using a parallel computing module such as a graphics processing unit (GPU). Programming GPUs to execute authentication tasks may take advantage of the massively parallel configuration of such processors, comprising hundreds of individual cores/threads, to process a large number of tasks concurrently, with minimal investment in hardware.

When distributing tasks toward workers with parallel computing capabilities, some embodiments of the present invention account for the current load and/or spare capacity of each such worker.

It will be clear to one skilled in the art that the above embodiments may be altered in many ways without departing from the scope of the invention. Accordingly, the scope of the invention should be determined by the following claims and their legal equivalents.

What is claimed is:

1. A system comprising:
a load balancer; and
a plurality of workers;
wherein each worker comprises at least one processor configured to process requests to authenticate handwritten signatures, and wherein the load balancer comprises at least one processor configured to:
accumulate a plurality of requests, each request identifying at least one handwritten signature to be authenticated, the each request received from a client application, wherein accumulating the plurality of requests comprises classifying the each request as urgent or non-urgent according to a service level agreement (SLA) covering the client application, wherein classifying the each request as urgent or non-urgent comprises determining a priority indicator of the each request according to $T_{min}/T$ and $N/N_{max}$, wherein T and N denote an average response time and a number of requests processed per unit time, respectively, specified in the SLA covering the client application, wherein $T_{min}$ is a lower bound of T and $N_{max}$ is an upper bound of N, and wherein the lower and upper bounds are taken over a plurality of SLAs currently active in the system;
determine whether an accumulation condition for the plurality of requests is satisfied; and
in response, when the accumulation condition is satisfied,
for a target request of the plurality of requests, select a target worker from the plurality of workers according to a first measure of performance of the target worker in processing an urgent request, according to a second measure of performance of the target worker in processing a non-urgent request, and further according to a relationship between a count of accumulated urgent requests and a count of accumulated non-urgent requests, and
in response to selecting the target worker, send the target request to the target worker for processing.

2. The system of claim 1, wherein the target request is urgent, and wherein selecting the target worker comprises:
when the count of accumulated urgent requests exceeds the count of accumulated non-urgent requests, selecting the target worker from a first set of workers having high spare capacity, low response time, and high stability indicators, relative to other workers; and
when the count of accumulated non-urgent requests exceeds the count of accumulated urgent requests, selecting the target worker from a second set of workers having low spare capacity, low response time, and high stability indicators, relative to other workers.

3. The system of claim 1, wherein the target request is non-urgent, and wherein selecting the target worker comprises:
when the count of accumulated urgent requests exceeds the count of accumulated non-urgent requests, selecting the target worker from a first set of workers having low spare capacity, high response time, and low stability indicators, relative to other workers; and
when the count of accumulated non-urgent requests exceeds the count of accumulated urgent requests, selecting the target worker from a second set of workers having high spare capacity, average response time, and low stability indicators, relative to other workers.

4. The system of claim 1, wherein the target worker comprises a parallel processing module configured to process multiple concurrent requests to authenticate handwritten signatures.

5. The system of claim 4, wherein the parallel processing module comprises a graphics processing unit (GPU) configured to process requests to authenticate handwritten signatures, and wherein at least one processor of the target worker comprises a multi-core central processing unit (CPU).

6. The system of claim 4, wherein the load balancer is further configured, in response to sending the target request to the target worker, to:
receive from the target worker a time indicator indicative of a time consumed by the target worker to process the target request; and
determine an indicator of response time of the target worker according to the time indicator, according to a count of requests processed by the target worker in parallel with the target request, and further according to a complexity measure indicative of a computational complexity of the target request.

7. The system of claim 6 wherein the first measure of performance of the target worker is determined according to the indicator of response time of the target worker and further according to a maximum number of requests that the target worker can process in parallel.

8. The system of claim 6, wherein the first measure of performance of the target worker is determined according to a stability indicator of the target worker, the stability indicator indicative of a level of confidence that the target worker will not fail to process the target request.

9. The system of claim 4, wherein accumulating the plurality of requests further comprises determining a complexity measure of the each request, the complexity measure indicative of a computational complexity of the each request, and wherein the load balancer is further configured, in response to selecting the target worker, to:
select a second request of the plurality of requests according to a complexity measure of the second request, wherein the complexity measure of the second request is within a predetermined distance of a complexity measure of the target request; and
in response to selecting the second request, send the second request to the target worker for processing, together with the target request.

10. The system of claim 1, wherein the target request comprises a set of accelerometer measurements indicative of a target handwritten signature.

11. The system of claim 1, wherein the SLA covering the client application distinguishes between a plurality of users of the client application, wherein the each request comprises a request to authenticate a selected user, and wherein the priority indicator of the each request is computed according to:

$$P = \alpha \frac{T_{min}}{T} + \beta \frac{N}{N_{max}} + \delta P[u]$$

wherein P[u] is a priority indicator of the selected user, and wherein $\alpha$, $\beta$, and $\delta$ are predetermined constants.

12. The system of claim 1, wherein the load balancer is further configured to:
estimate whether all requests of the plurality of requests can be processed by the plurality of workers in accordance with all SLAs covering the all requests; and
in response, when the all requests cannot be processed in accordance with all SLAs,
for the each request of the plurality of requests, increase an expected response time with an amount proportional to an expected response time specified in an SLA covering the client application; and
select the target worker from the plurality of workers according to a result of the estimation.

13. The system of claim 1, wherein the load balancer is further configured to:
estimate whether all requests of the plurality of requests can be processed by the plurality of workers in accordance with all SLAs covering the all requests; and
in response, when the all requests cannot be processed in accordance with all SLAs,
for the each request of the plurality of requests, decrease an expected number of requests processed per unit time by an amount proportional to a number of requests processed per unit time, the number specified in an SLA covering the client application; and
select the target worker from the plurality of workers according to a result of the estimation.

14. A client machine comprising:
a memory; and
at least one processor connected to the memory and configured to execute a client application, wherein executing the client application comprises:
sending a target request to a biometric authentication system comprising a load balancer and a plurality of workers, each worker comprising at least one processor configured to process requests to authenticate handwritten signatures, and wherein the target request identifies at least one handwritten signature to be authenticated; and
in response to sending the target request, receiving a response from the biometric authentication system, the response indicative of an authenticity of a user of the client application,
and wherein the load balancer is configured to:
add the target request to an accumulating plurality of requests, wherein adding the target request comprises classifying the target request as urgent or non-urgent according to a service level agreement (SLA) covering the client application, wherein classifying the target request as urgent or non-urgent comprises determining a priority indicator of the target request according to $T_{min}/T$ and $N/N_{max}$, wherein T and N denote an average response time and a number of requests processed per unit time, respectively, specified in the SLA covering the client application, wherein $T_{min}$ is a lower bound of T and $N_{max}$ is an upper bound of N, and wherein the lower and upper bounds are taken over a plurality of SLAs currently active in the biometric authentication system;
determine whether an accumulation condition for the plurality of requests is satisfied; and
in response, when the accumulation condition is satisfied, select a target worker from the plurality of workers according to a first measure of performance of the target worker in processing an urgent request, according to a second measure of performance of the target worker in processing a non-urgent request, and further according to a relationship between a count of accumulated urgent requests and a count of accumulated non-urgent requests, and
in response to selecting the target worker, send the target request to the target worker for processing.

15. The client machine of claim 14, wherein the target request is urgent, and wherein selecting the target worker comprises:
when the count of accumulated urgent requests exceeds the count of accumulated non-urgent requests, selecting the target worker from a first set of workers having high spare capacity, low response time, and high stability indicators, relative to other workers; and
when the count of accumulated non-urgent requests exceeds the count of accumulated urgent requests, selecting the target worker from a second set of workers having low spare capacity, low response time, and high stability indicators, relative to other workers.

16. The client machine of claim 14, wherein the target request is non-urgent, and wherein selecting the target worker comprises:
when the count of accumulated urgent requests exceeds the count of accumulated non-urgent requests, selecting the target worker from a first set of workers having low spare capacity, high response time, and low stability indicators, relative to other workers; and
when the count of accumulated non-urgent requests exceeds the count of accumulated urgent requests, selecting the target worker from a second set of workers having high spare capacity, average response time, and low stability indicators, relative to other workers.

17. The client machine of claim 14, wherein the target worker comprises a parallel processing module configured to process multiple concurrent requests to authenticate handwritten signatures.

18. The client machine of claim 17, wherein the parallel processing module comprises a graphics processing unit (GPU) configured to process requests to authenticate handwritten signatures, and wherein at least one processor of the target worker comprises a multi-core central processing unit (CPU).

19. The client machine of claim 17, wherein the load balancer is further configured, in response to sending the target request to the target worker, to:
receive from the target worker a time indicator indicative of a time consumed by the target worker to process the target request; and
determine an indicator of response time of the target worker according to the time indicator, according to a count of requests processed by the target worker in parallel with the target request, and further according to a complexity measure indicative of a computational complexity of the target request.

20. The client machine of claim 19, wherein the first measure of performance of the target worker is determined according to the indicator of response time of the target worker and further according to a maximum number of requests that the target worker can process in parallel.

21. The client machine of claim 19, wherein the first measure of performance of the target worker is determined according to a stability indicator of the target worker, the stability indicator indicative of a level of confidence that the target worker will not fail to process the target request.

22. The client machine of claim 17, wherein adding the target request further comprises determining a complexity measure of the target request, the complexity measure indicative of a computational complexity of the target request, and wherein the load balancer is further configured, in response to selecting the target worker, to:
  select a second request of the plurality of requests according to a complexity measure of the second request, wherein the complexity measure of the second request is within a predetermined distance of a complexity measure of the target request; and
  in response to selecting the second request, send the second request to the target worker for processing, together with the target request.

23. The client machine of claim 14, wherein the target request comprises a set of accelerometer measurements indicative of the one handwritten signature.

24. The client machine of claim 14, wherein the SLA covering the client application distinguishes between a plurality of users of the client application, wherein the target request comprises a request to authenticate a selected user, and wherein the priority indicator of the target request is computed according to:

$$P = \alpha \frac{T_{min}}{T} + \beta \frac{N}{N_{max}} + \delta P[u]$$

wherein P[u] is a priority indicator of the selected user, and wherein α, β, and δ are predetermined constants.

25. The client machine of claim 14, wherein the load balancer is further configured to:
  estimate whether all requests of the plurality of requests can be processed by the plurality of workers in accordance with all SLAs covering the all requests; and
  in response, when the all requests cannot be processed in accordance with all SLAs,
    for each request of the plurality of requests, increase an expected response time with an amount proportional to an expected response time specified in an SLA covering the each request, and
    select the target worker from the plurality of workers according to a result of the estimation.

26. The client machine of claim 14, wherein the load balancer is further configured to:
  estimate whether all requests of the plurality of requests can be processed by the plurality of workers in accordance with all SLAs covering the all requests; and
  in response, when the all requests cannot be processed in accordance with all SLAs,
    for each request of the plurality of requests, decrease an expected number of requests processed per unit time by an amount proportional to a number of requests processed per unit time, the number specified in an SLA covering the each request, and
    select the target worker from the plurality of workers according to a result of the estimation.

27. A method comprising:
  employing a processor of a computer system to accumulate a plurality of requests to authenticate handwritten signatures, each request of the plurality of requests received from a client application, wherein accumulating the requests comprises classifying the each request as urgent or non-urgent according to a service level agreement (SLA) covering the client application, wherein the each request indicates at least one handwritten signature to be authenticated, wherein classifying the each request as urgent or non-urgent comprises determining a priority indicator of the each request according to $T_{min}/T$ and $N/N_{max}$, wherein T and N denote an average response time and a number of requests processed per unit time, respectively, specified in the SLA covering the client application, wherein $T_{min}$ is a lower bound of T and $N_{max}$ is an upper bound of N, and wherein the lower and upper bounds are taken over a plurality of SLAs currently active;
  employing the processor to determine whether an accumulation condition for the plurality of requests is satisfied; and
  in response, when the accumulation condition is satisfied,
    for a target request of the plurality of requests, employing the processor to select a target worker from a plurality of workers according to a first measure of performance of the target worker in processing an urgent request, according to a second measure of performance of the target worker in processing a non-urgent request, and further according to a relationship between a count of accumulated urgent requests and a count of accumulated non-urgent requests, and
    in response to selecting the target worker, employing the processor to send the target request to the target worker, the target worker comprising a processor configured to process requests to authenticate handwritten signatures.

\* \* \* \* \*